(No Model.) 2 Sheets—Sheet 1.
O. OHLSSON.
CENTRIFUGAL CREAM SEPARATOR.
No. 593,307. Patented Nov. 9, 1897.
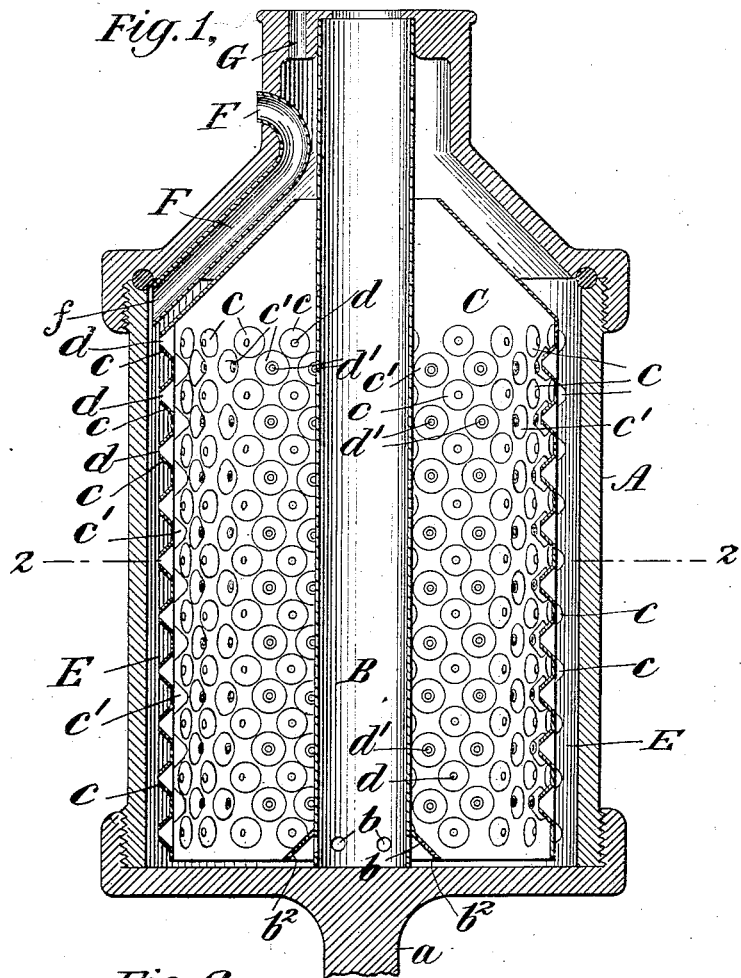
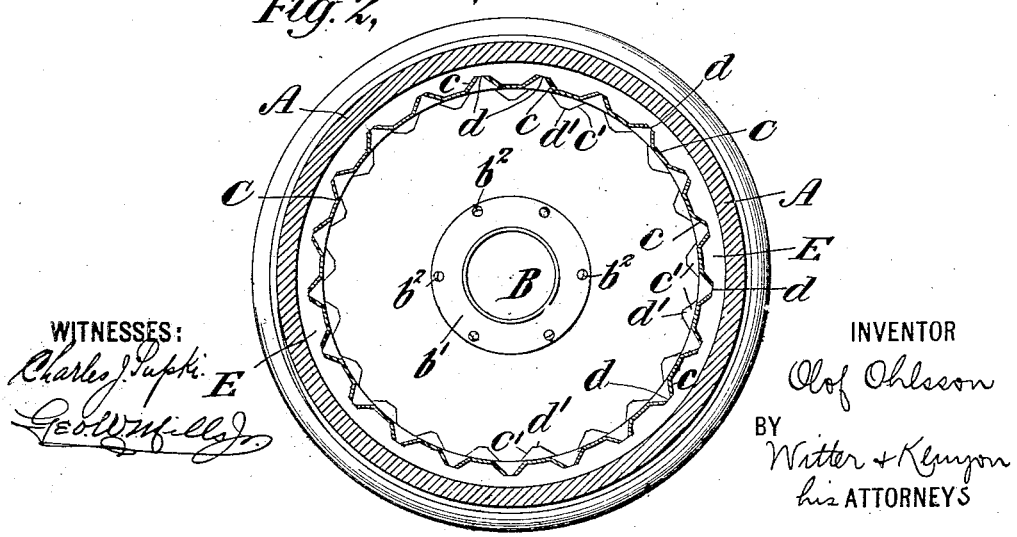
WITNESSES:
INVENTOR
Olof Ohlsson
BY Witter + Kenyon
his ATTORNEYS

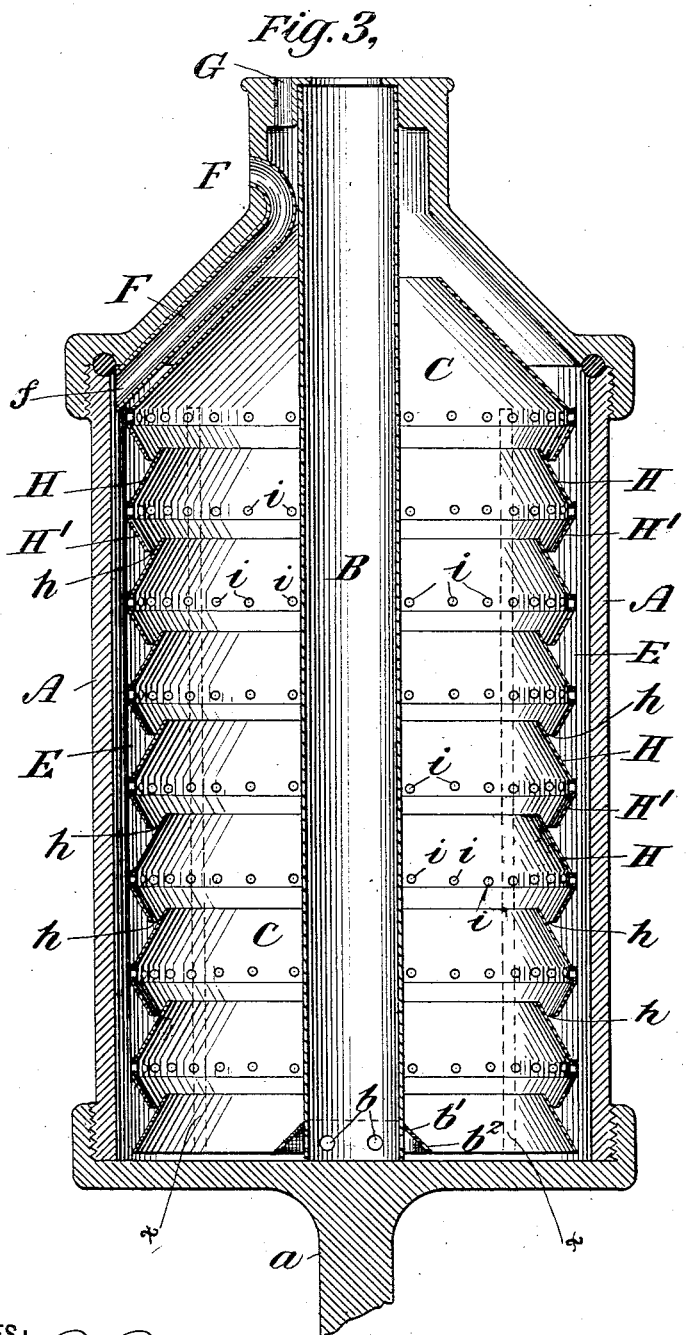

UNITED STATES PATENT OFFICE.

OLOF OHLSSON, OF NEWARK, NEW JERSEY.

CENTRIFUGAL CREAM-SEPARATOR.

SPECIFICATION forming part of Letters Patent No. 593,307, dated November 9, 1897.

Application filed June 19, 1896. Serial No. 596,123. (No model.)

*To all whom it may concern:*

Be it known that I, OLOF OHLSSON, a citizen of the United States, and a resident of Newark, in the county of Essex, State of New Jersey, have invented a new and useful Improvement in Centrifugal Cream-Separators, of which the following is a specification.

My invention relates to centrifugal cream-separators.

It has for its object to improve the efficiency and increase the capacity of such separators. This object is accomplished by means of a cylindrical partition fitted in the bowl and adapted to rotate with it, having inclined surfaces converging together away from the center toward the periphery of the bowl, with openings at the point of convergence to permit the outward and undisturbed passage of the blue milk, and having similar inclined surfaces converging toward the center of the bowl, with openings at the points of convergence to permit the inward and undisturbed flow of the cream.

My invention consists of the devices hereinafter more particularly described, and claimed in the claims at the end of the specification.

Figure 1 is a vertical section through a cream-separator embodying my improvement, with the partition partly in section and partly in elevation. Fig. 2 is a plan view, partly in section. Fig. 3 is a vertical section of a modification.

A is the bowl of a centrifugal cream-separator; B, the central pipe for the inlet of the whole milk.

$b\ b$ are holes for the passage of the milk from the pipe B into the space beneath the partition $b'$, and $b^2$ are openings in the partition to permit the passage of the milk into the lower part of the bowl.

C is a partition which is preferably removably fitted in the bowl and secured in it so that it will rotate with the bowl. This partition, as shown in Fig. 1, has a series of truncated-cone projections $c\ c$, each one having an opening $d$, and other series of truncated cones $c'\ c'$, each one having an opening $d'$. The truncated cones $c\ c$ point outward away from the center and toward the periphery of the bowl, and the truncated cones $c'\ c'$ point inward toward the center of the bowl. The entire surface of the partition C is preferably covered with these cones, the different series of outwardly or inwardly projecting cones being arranged intermediate with one another, as shown in Fig. 1. A space E surrounds the partition and furnishes a means for the escape upward of blue milk to the outlet-pipe F, whence it is discharged.

G is the outlet-pipe for the discharge of the cream.

The surfaces of the truncated cones $c\ c$, which are nearer the center of the bowl, have inclined surfaces converging toward the openings $d$, away from the center and toward the periphery of the bowl. Blue milk is forced outward by the centrifugal action of the bowl, down the said outward-converging surfaces, to and through the openings $d$. The surfaces of the cones $c'\ c'$, which are farther from the center of the bowl and nearer its periphery, form inclined surfaces converging toward the center of the bowl. The cream that may still remain in the blue milk in the space E is under the centrifugal action of the bowl, which is always greatest nearer its periphery, forced down these inward-converging surfaces to and through the opening $d'$. In this passage it is comparatively undisturbed by any outward flow of blue milk, and the small globules of butter, fat, or cream are brought together as the inclined sides converge together. The smaller globules are thereby united or coalesced into larger globules, and are thus, after passing through the opening $d'$, better enabled to force their way inward against the outflowing blue milk. In this way a larger percentage of cream is extracted from the milk than in the ordinary separator.

In the ordinary separator the general tendency of the blue milk is to move in as nearly straight lines as possible to the mouth $f$ of the blue-milk discharge-outlet F. In my improved device this tendency is overcome, as the blue milk tends to move outward toward the openings $d$ and into the space E in horizontal lines. The capacity of the bowl is thereby increased and a less quantity of cream is swept out by the blue milk in its flow outward toward the sides of the bowl, and less is therefore discharged in the blue milk passing out through the pipe F, and less than is the case with the ordinary cream-separator.

Fig. 3 shows a modification of the partition C. Instead of different series of truncated cones I employ inclined surfaces H H'. At the outer meeting-points of these surfaces is a row of openings $i\ i$ for the discharge of blue milk into the space E, whence it escapes through the pipe F. At its inner edge the surface H projects beyond and above the inner edge of the surface H', but a space $h$ is left between them for the inward passage of cream. The different surfaces H H' H H', &c., are secured to one another in any suitable manner. As shown in the drawings, they are soldered to the uprights $x\ x$. (Shown in dotted lines.) The operation of the modification shown in Fig. 3 is precisely similar to the device shown in Fig. 1. The surfaces H and H' which are nearer to the center of the bowl form inclined surfaces converging outward toward the periphery of the bowl. Down these surfaces the blue milk passes, and thence out through the openings $i\ i$ into the space E, and thence is discharged through the pipe F. The surfaces H H' which are farther from the center of the bowl form inward-inclined surfaces converging inward toward the center of the bowl. Any cream that may be in the blue milk in the space E is through the centrifugal action of the bowl, which is greater at the periphery than elsewhere, forced inward down these converging surfaces and through the openings $h$. The smaller globules of cream are thereby united or coalesced, and are thus better able to force their way inward after passing through the openings $h$ against the outflowing blue milk. They are assisted in this inward movement by means of the upward extension of the surfaces H inward and upward beyond the end of the surfaces H'. While passing along this extension they are protected from the outward flow of the blue milk.

What I claim as new, and desire to secure by Letters Patent, is—

1. The combination with a bowl of a centrifugal separator, having a supply-pipe for the whole milk and discharge-pipes for the blue milk and the cream, of a partition having on its outer surface truncated cones provided with openings for the outward escape of the blue milk, and having on its inner surface truncated cones having openings for the escape inward of the cream, substantially as set forth.

2. The combination with the bowl of a centrifugal separator having a supply-pipe for the whole milk and discharge-pipes for the blue milk and the cream, of a cylindrical partition C having on its outer surface a series of truncated cones $c\ c$ provided with openings for the outward escape of the blue milk and having on its inner surface truncated cones $c'\ c'$ having openings for the escape inward of the cream, substantially as set forth.

In testimony whereof I have signed my name to this specification in the presence of two subscribing witnesses.

OLOF OHLSSON.

Witnesses:
CHARLES J. PUPKI,
EDWIN SEGER.